Dec. 12, 1933.   F. GERTH ET AL   1,939,345
DEVICE FOR INFLUENCING THE DIRECTION OF ELECTRIC WAVES
Filed Oct. 21, 1929   2 Sheets-Sheet 1

Inventors:
Felix Gerth, Walter Hahnemann,
Wilhelm Scheppmann,
by Paul E. Schilling,
Attorney.

Dec. 12, 1933.  F. GERTH ET AL  1,939,345
DEVICE FOR INFLUENCING THE DIRECTION OF ELECTRIC WAVES
Filed Oct. 21, 1929   2 Sheets-Sheet 2
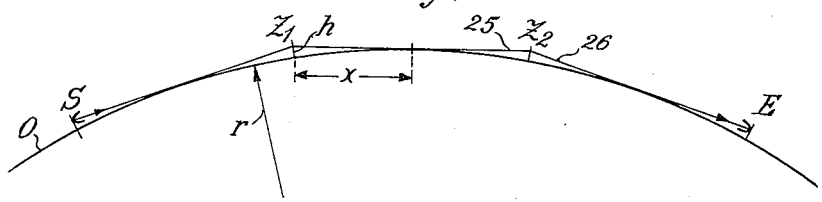
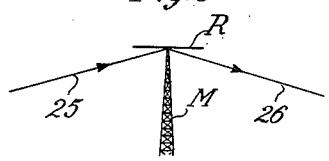
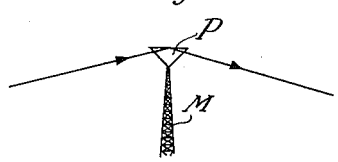
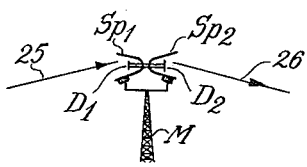
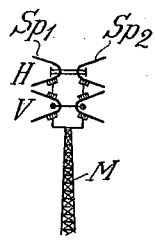
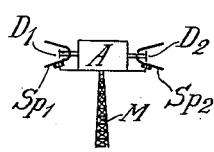
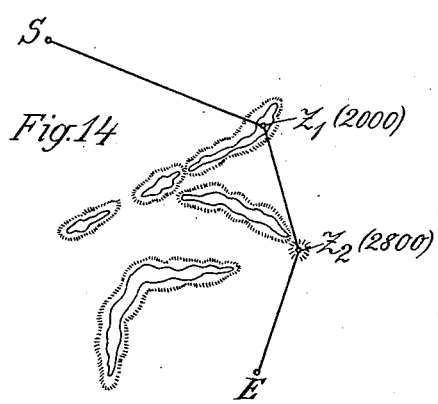
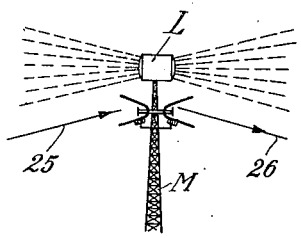
Inventors:
Felix Gerth, Walter Hahnemann,
Wilhelm Scheppmann,
by Paul E. Schilling,
Attorney.

Patented Dec. 12, 1933

1,939,345

UNITED STATES PATENT OFFICE 1,939,345

DEVICE FOR INFLUENCING THE DIRECTION OF ELECTRIC WAVES

Felix Gerth, Berlin-Tempelhof, Walter Hahnemann, Berlin - Marienfelde, and Wilhelm Scheppmann, Berlin-Tempelhof, Germany, assignors to C. Lorenz Aktiengesellschaft, Berlin-Tempelhof, Germany Application October 21, 1929, Serial No. 401,261, and in Germany October 20, 1928

8 Claims. (Cl. 250—11)

In order to control the direction of the electric waves in wireless telegraphy for sending and receiving purposes, combinations of aerial wires have been suggested to secure certain directional effects of the sending and receiving aerial system. All these arrangements consist of a number of individual aerials, which are excited in a particular manner, while the relations of the phases of the flowing currents are so chosen that the emanation of the currents is increased in a certain direction through the action of interference, while it is reduced in the other directions. With all these arrangements, however, only a limited directional effect can be had, because of the physical principles involved.

The present invention is based upon the idea that perfect directional effects, such as are known in optics and rotary searchlights, may be realized if uniform wire or metal structures, which serve for a conductive element for influencing the direction of the emitted waves, are employed instead of aerials consisting of single wires; and such structures are chosen sufficiently large in comparison to the length of the emited waves.

This result of course can only be secured with waves whose length is very small, ranging from a few meters down to several centimetres, for otherwise these conducting structures would have to be of a dimension much too large. The relations of the phases of individual rays of light play no important part in optical devices for the reflection, refraction or deflection thereof. This is explained by the fact that said devices are very big as compared with the wave-length. These laws are utilized according to the present invention for wireless by the employment of reflecting, refracting or deflecting elements, which are large as compared with the length of the electric waves concerned. In this case the laws of radiation known in optics thus hold good in the wireless art and it is possible to reflect, refract or deflect these electric waves more or less strongly, according to requirements, in any desired direction and thus transmit them to a definite chosen locality.

In the drawings some arrangements according to the present invention are illustrated by way of example.

Figure 8 shows a transmission system for sending ultra-short waves over long distances by means of intermediate stations.

Figure 9 presents an intermediate station for transmission according to Figure 8 by means of a reflecting surface.

Figure 10 shows an intermediate station for transmission according to Figure 8 by means of a prism.

Figure 11 is a view of an intermediate station for transmission according to Figure 8 with two parabolic reflectors.

Figure 12 shows an intermediate station including two parabolic reflectors and an amplifier between them.

Figure 13 shows an intermediate station for the transmission of differently polarized waves.

Figure 14 outlines a transmission system for a mountainous country with intermediate stations located at different levels, and Fig. 15 shows the same apparatus as Fig. 11, with a luminous beacon added.

The invention as utilized for reflection aerials, extensively used in the wireless art, is explained more fully with the aid of a few illustrations. In practice up to the present, there have been used for transmission parabolic structures, in which an aerial wire is disposed, at a distance from the focus of the parabola amounting to about one fourth of the wave-length. As has been proved by tests and by theory, certain directional effects can be obtained by means of such appliances, but the angle of diffusion of the cone of rays emitted is rather large and still amounts to 20 to 30 degrees.

Figure 1:
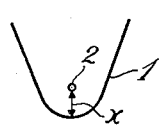
Figure 1 is a diagram of a parabolic reflector with exciting aerial conductor.

Figure 1 represents a parabolic reflector 1 in which is the aerial wire. The distance of the later from the reflecting surface is designated by $x$ and up to the present it has been chosen equal to about $\frac{1}{4} \lambda$ (a quarter of a wave length). The size of the parabola is determined by the value $x$ which constitutes in the appropriate mathematical formula the so-called parameter. The characteristic of some previous systems of reflectors is represented in Figure 2 in the form of a curve or diagram 3 from which it appears that the opening or focus angle α of the rays is relatively great.

Figure 2:
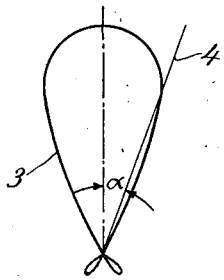
Figure 2 is a chart or curve showing the directional effect of certain well-known aerials.
Figure 3:
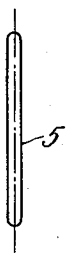
Figure 3 illustrates the directional characteristic of a parabolic reflector according to this invention.

If there is a receiving station in the direction of the line 4 illustrated in Figure 2, said station is capable of receiving a considerable portion of that energy which is absorbed by a receiver situated on the center line of the diagram, that is to say directly in front of the reflector. In contradistinction, by the present invention the width of the beam of waves is rendered so narrow that it will correspond to the beam of a search-light. Such a characteristic is shown by the graph illustrated in Figure 3.

Figure 4:
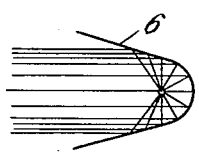
Figure 4 shows diagrammatically the emission of rays from a parabolic reflector according to the present invention.

The problem to be solved demands that the distance of the aerial wire from the reflecting parts of the parabolic reflector be made great in proportion to the quarter length of wave; that is to say, this distance and in consequence the dimensions of the whole reflector must amount to several wave-lengths. A system of aerial wires of this type can of course be utilized only with extremely short waves of the order of magnitude referred to above. In the case of a one meter wave, for instance, the distance of the aerial wire from the mirror will be several metres, while the opening or mouth of the reflector and its other dimensions will be greater. Reference is had hereby to a paraboloid 6, known in optics and represented in Figure 4.

In the case of stationary plants such reflectors may be constructed for a wave-length of several meters, but for transportable stations much smaller wave-lengths of a few decimeters will be used, in order to keep down the dimensions of the reflectors, which according to the invention should be big in proportion to the wave-length. For portable stations such a reflector need not be larger than for ordinary searchlights. Unless the requirements of the invention "dimensions in proportion to the wave length" are fulfilled, the emitted waves will not be parallel, but diffusion or spreading of the rays will occur.

The invention is not limited to a reflecting construction, but other arrangements may be devised, which will act in conformity with optical laws. The passage of the waves emitted by a sending device can, for instance, be deflected by means of an interposed prism consisting of wires and metal surfaces, whose side must likewise be great in proportion to the wave length, as is done in a similar manner in optics, so that the said waves may thus be conveyed to a selected point. According to these principles a system may be designed which will, in the same manner as lenses used in optics, render a cone of electric waves converging or diverging.

Figure 6:
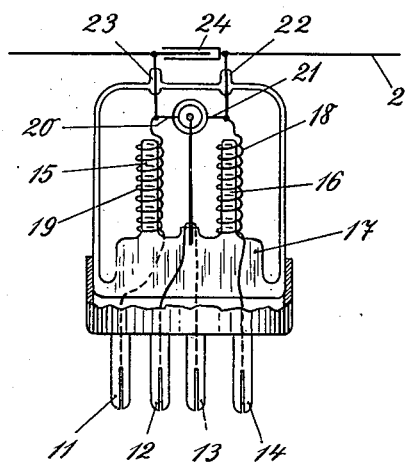
Figure 6 shows a sender for ultra-short waves adapted for reflecting or directional purposes.
Figure 7:
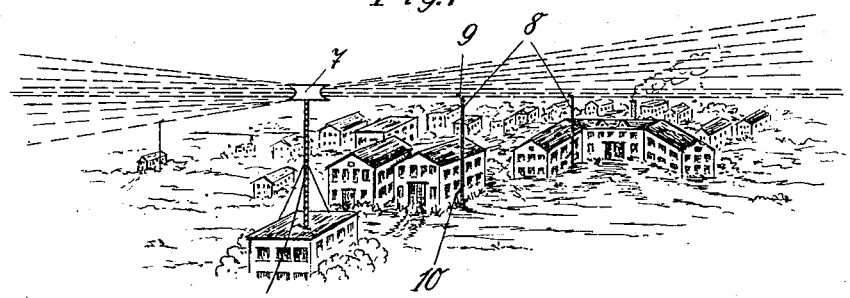
Figure 7 shows a broadcasting station for a town adapted for picture transmission over long distances.

Any of the well known short wave transmitters may be employed, but the sending apparatus represented in Figure 6 offers special advantages, since said apparatus is of very simple design. All portions of the ˙oscillatory circuit are within the vacuum valve, so that merely plug connections are required for the leads supplying the current or for the aerial wire. The plugs for the connections are designated by 11, 12, 13, 14. Upon two glass carriers 15 and 16, which are united with the glass base or support 17 are wound choke coils 18 and 19 in the anode and the grid circuit. With the production of ultra-short waves it is necessary to provide choke coils as near as possible to the electrodes within the valve, which will assure that the high frequency oscillations will not enter the leads of the current supply. The anode 21 is constructed as usual and it is supported by the carrier 16. Besides, it surrounds the grid 20. In the example shown there are provided no choke coils in the heating circuit, while in practice it has proved very often necessary to employ these. Close to the grid and the anode small projections 22 and 23 are provided, through which wires pass to a small oscillating exciter antenna 2. For the purpose of tuning the exciter antenna a capacity 24 is arranged between the projections 22 and 23. The connecting wires for the supply of current; that is to say the A and B batteries, are connected to the contact plugs of the valve. The modulation according to the various signals can be carried out in any suitable way, preferably by the Heising method, as a modulation by the anode current.

Figure 5:
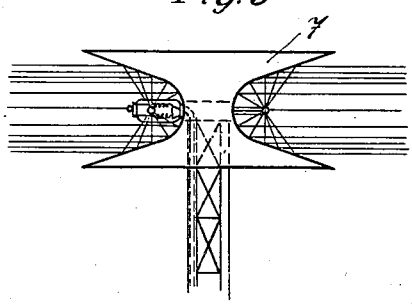
Figure 5 is a diagrammatic view of a parabolic reflector for the radiation of a beam of waves.

For spreading a broadcasting program within cities there may be used a sending apparatus illustrated diagrammatically in Figure 5. By means of a circular parabolic reflector 7 the district to be supplied is covered by the waves in a plane above the houses. If transmission of visual images is to be done, this apparatus is of special advantage, since television has been rendered possible solely by the utilization of ultra-short waves. In order to effect television over long distances in a manner free of objections, it is necessary to operate with a picture-point figure of several 100,000 Hertz. However, with such high frequencies the carrier frequencies of the broadcasting range as used at present, cannot be modulated, as is well known. A fine modulation, however, is at once possible when making use of ultra-short waves, since the difference of frequency is sufficiently great. Besides, by using the transmitting apparatus according to Figure 5, which is illustrated upon a site with buildings, the degree of efficiency of transmission is considerably higher, since all the energy radiated into space or absorbed by the surface of the earth with present methods need not be generated. In order to render possible the reception of the waves emitted from the circular parabolic reflector 7 upon the receiving apparatus mounted in the houses, some of the waves must be diverted from the layer or plane of transmission into the houses by means of reflecting surfaces. For that purpose reflecting surfaces 9 are provided on small poles 8 of any preferred type, on the houses or elsewhere, to cause the waves to travel downwards. These waves may either act directly on antenna held up in an appropriate manner, or a repeated reflection is accomplished by means of a surface 10. In consideration of the shortness of the waves used it is possible without any difficulty to make the reflecting surface large enough to pass sufficient quantities of energy to the receiving apparatus. In order to augment the reception the waves can be concentrated by means of a system of lenses.

The size of the elements introduced into the path of the rays must always be large as compared with the wave length.

Transmission by means of ultra-short waves over long distances is possible only by the utilization of the device described hereinafter. With such short waves, i. e. wave-lengths of less than 10 metres, reception is possible only at such places where the direct waves of the transmitting station will impinge. Therefore, the radius of action is dependent on the height of the transmitting apparatus above the ground, since the direct waves will only travel to the point of tangency with the earth; in other words to the periphery of a great circle passing through the transmitting station. By mathematical deduction it follows that the radius of action $$x = \sqrt{2hr},$$

in which equation $h$ represents the height of the transmitting apparatus above the ground and $r$ the radius of the earth's great circle aforesaid. If values are introduced in this equation it follows, that in case of the transmitting apparatus being arranged at a height of 50 metres, a radius of action of about 25 kilometres is obtained, while a level of 100 metres will bridge a distance of 35 kilometres. The radius of action will be doubled, if the receiving station is located at the same level above ground as the transmitting station. For greater radii of action, the transmitting station must be located at such elevations above the ground, that technical difficulties will ensue. For instance, with a mast 1,400 metres high, which of course cannot be constructed, there is obtained a radius of action of 130 kilometres only. In practice, however, distances will have to be covered which naturally are much greater. For the purpose of covering such long distances according to the present invention intermediate stations are arranged between the sending station and the final receiving station, and the intermediate stations will pass on the waves received in such a direction that no obstructions will bar the path thereof.

An arrangement of this kind is disclosed with reference to Figure 8. On the ground O two masts are erected, one of which carries the transmitting device S while the other one carries the receiver E. According to the illustration one cannot see over the whole stretch of earth's surface between the sending and receiving stations. Hence there is no direct transmission possible between S and E by means of ultra-short waves. With our invention two intermediate stations $Z_1$, $Z_2$ are arranged between S and E. Each intermediate station is located on masts whose height is designated by $h$. The distance between $Z_1$ and $Z_2$, and S and $Z_1$, or $Z_2$ and E respectively amounts to twice the tangential length $x$. The radius of the earth's great circle through these points is designated by $r$ as above. The passing on the waves transmitted by S is effected from $Z_1$ to $Z_2$ and then to E along lines tangent to the ground.

Figures 9 to 12 show apparatus by which the desired direction of transmission is ensured. The simplest appliance consists of a reflecting surface R according to Figure 9 mounted on the mast M. As the ultra-short waves follow optical laws, it is only necessary to put a reflecting surface into the path of the waves, and wave 25 is deflected in the direction 26 and travels to the next intermediate station but said surface must be as great or long as a multiple of the wave-length used. In lieu of a reflecting surface a prism P may be employed as represented in Figure 10.

The conditions should be rendered more favorable, if the operation is effected by a concentration of the said rays from S to $Z_1$ and so on further. Preferably for this purpose parabolic reflectors according to Figure 4 may be used, with dimensions amounting to a multiple of the wave length, to obtain a high directive effect.

As shown in Figure 11 two mirrors $Sp_1$ and $Sp_2$ are mounted on the mast M. The waves coming from 1 impinge upon a suitable device $D_1$ being connected to a device $D_2$. The rays coming from 25 are thus directly passed on by the device $D_2$, and adjustment of the reflectors is made for the new direction of the waves to the next intermediate station.

As illustrated in Figure 12, a receiver and sender with amplifying means are introduced between the devices $D_1$ and $D_2$. The arrangement of the receiver and transmitter will be useful if local conditions are unfavorable and waves arriving from direction 25 and travelling beyond the intermediate station will interfere with rays travelling in the direction 26 by reflection. In this instance different waves must be employed.

It might appear that if an amplifier at an intermediate station is needed, no advantage accrues over the use of long waves. The spreading of the ultra-short waves can be limited by means of directive devives, particularly parabolic reflectors, in such a way that a very sharp cone of waves will be obtained and a concentration of the energy similar to the beam of a search-light is possible. It is only necessary to fix the direction in such a manner that the cone of waves emitted by the transmitting station will actually encounter the receiving or intermediate station. A further advantage which is of particular importance and peculiar to ultra-short waves, is to be seen in the fact that the spreading of the waves occurs independent of the weather conditions. Fog, moisture or the like will not be able to cause an interruption of the transmission, and above all there are no fading effects. In addition there is available a frequency which will admit of a wide range of modulation, since the carrier frequency is high. It will be possible to forward simultaneously various speeches and pictures in large numbers on the same wave, and it will even be possible to have the number of the modulators so high that cables now used nowadays will become largely superfluous. The expense of intermediate stations, even with amplifiers will be considerably less than the laying out of a multiplex cable. A mast 50 metres high will cost for instance only $2,000 while one meter of cable must be calculated at about $2; thus a mast will cost no more than one kilometer of telephone cable. The arrangement of the intermediate amplifiers will not lessen the economy, for in the case of a cable having a length of 75 kilometres, there must be provided an intermediate amplifier for each wire, while in our system there is required only one intermediate amplifier at most. The expense of operators need not be considered, since these will be about the same in each case.

From this brief survey of figures it will be noted that our system permits a large saving beyond doubt.

If a single beam will not suffice, two beams of waves of different wave-length or differently polarized, may be transmitted together as shown in Figure 13. The uppermost reflectors H will, for instance effect the transmission of horizontally polarized waves, while the lower one will ensure the passing on of the vertically polarized waves. Such a separate transmission is rendered possible through a corresponding position of the necessary devices within the mirror.

Special advantages are derived in mountainous districts, where no unobstructed line of sight extends between the places of transmission and reception. Here the intermediate transmission station $Z_1$ may be arranged on the summit of a mountain having a hight of 2000 metres (Figure 14). This intermediate station need not be mounted on a mast but only a few metres above the ground to avoid absorption through the ground or a bending of the direction of the waves.

The second intermediate transmitting device is at a height of 2800 metres and a direct radiation to the receiving station in the valley is secured by the correct adjustment of the parabolic reflector.

In order to adapt the system to aeroplane service beacons may be provided on the masts. Figure 15 shows the same electrical devices as in Figure 11, a beacon or signal light is above them.

We claim:

1. Apparatus for the transmission of wireless signals comprising in combination a transmitting station, a distant receiving station, and means for controlling the direction of waves emitted by the said transmitting station and located thereat, said means comprising a metal reflector and an antenna at the focus of said reflector, whose focal distance and other dimensions exceed several times the wave-length employed, so as to obtain approximately parallel waves.

2. Apparatus for the transmission of wireless signals comprising in combination a transmitting station, a distant receiving station, and means for controlling the direction of waves emitted by the said transmitting station and located thereat, said means forming a circular parabolic reflector effecting the radiation of the waves, the dimensions of which reflector are a multiple of the length of said waves.

3. Apparatus for the transmission of wireless signals comprising in combination a transmitting station, a distant receiving station, means for controlling the direction of waves emitted by the said transmitting station and located thereat, and a prism arranged in the path of the waves, the length of the side of said prism amounting to several times the wave length.

4. Apparatus for the transmission of wireless signals comprising in combination a transmitting station, a distant receiving station, means for controlling the direction of waves emitted by the said transmitting station and located thereat, and an element arranged in the path of the waves for the purpose of collecting the latter, the dimensions of said element being large in proportion to the wave-length.

5. Apparatus for the transmission of short waves comprising means for generating said waves, a paraboloidal reflector, and an antenna for disseminating said waves located approximately at the focus of said reflector, said reflector having a focal length which is several times the length of said waves.

6. Apparatus for the transmission of short waves comprising means for generating said waves, a circular parabolic reflector, and a circular antenna for disseminating said waves lying along the focus of said reflector, said reflector having a focal length equal to or exceeding several times the length of said waves.

7. Apparatus for the transmission of short waves comprising a device for emitting said waves in a substantially horizontal plane, means for supporting said emitting device in elevated position above the earth's surface, a distant receiving device positioned outside the path of the waves as emitted by said emitting device, means for supporting said receiving device in elevated position above the earth's surface, and means maintained in elevated position above the earth's surface and located in the path of the emitted waves for changing the direction thereof in substantially horizontal plane thereby to avoid encountering intervening obstructions on the earth's surface, said means comprising a reflector the dimensions of which are a multiple of the length of said waves.

8. Apparatus for the transmission of short waves comprising a device for emitting said waves in a substantially horizontal plane, means for supporting said device in elevated position above the earth's surface, a distant receiving device positioned outside the path of the waves as emitted by said first-mentioned device, means for supporting said receiving device in elevated position above the earth's surface, and means maintained in elevated position above the earth's surface and located in the path of the emitted waves for changing the direction thereof in a substantially horizontal plane thereby to avoid encountering intervening obstructions on the earth's surface, said means comprising a plurality of reflectors so spaced that the waves emitted by the first-mentioned device impinge upon the first of the reflectors and are directed to the next of the reflectors and such directed waves impinging upon the last of the reflectors are directed to the receiving device to impinge thereon, the dimensions of each reflector being a multiple of the length of the waves.

FELIX GERTH.
WALTER HAHNEMANN.
WILHELM SCHEPPMANN.